3,326,881
POLYMERIZATION OF VINYLIDENE-CONTAINING MONOMERS WITH AN INITIATOR CONSISTING OF AN ALKALI METAL DERIVATIVE OF A FUNCTIONAL HALOGEN-SUBSTITUTED AROMATIC COMPOUND
Carl A. Uraneck, Ollie G. Buck, William J. Trepka, and Richard J. Sonnenfeld, Bartlesville, Okla., assignors to Phillips Petroleum Company, a corporation of Delaware
No Drawing. Filed Oct. 11, 1963, Ser. No. 315,709
28 Claims. (Cl. 260—94.6)

This invention relates to the polymerization of vinylidene-containing monomers. In another aspect it relates to a process for preparing polymers which contain reactive groups. In still another aspect it relates to an improved polymerization initiator composition.

Organo-alkali metal compounds such as butyllithium or lithium-naphthalene adducts have proven useful for the polymerization of a wide variety of vinylidene-containing monomers, particularly conjugated dienes such as butadiene or isoprene. Such initiator systems can be used to prepare polymers which are terminally reactive by terminating the polymerization in such a way that the alkali metal atoms present in the polymer are replaced with reactive groups. Liquid, semi-solid and solid polymers can be prepared by varying the amount of initiator used. Increasing the concentration of initiator in relation to the monomer charged reduces the molecular weight of the product. When preparing rubbery polymers, however, the molecular weight of the product is difficult to control. The reason for this lies partly in the fact that such small amounts of initiator are ordinarily required for production of the solid polymers that accurate regulation of the initiator concentration is difficult. Various steps have been taken for molecular weight control, such as the use of additives or the manipulation of process conditions to increase the inherent viscosity of the product. These measures complicate the process since they introduce an additional variable which must be correlated with the other conditions affecting the properties and yield of the polymer.

We have now discovered an improved method for polymerizing vinylidene-containing monomers with an initiator system of limited solubility in hydrocarbon, thereby permitting more accurate regulation of the inherent viscosity of the product. Our polymerizations are carried out in a reaction medium which is predominantly hydrocarbon, liquid and otherwise inert to the polymerization process. Polymers of relatively high inherent viscosity can readily be obtained without additional reagents, and the molecular weight of the product can be controlled by varying the amount of initiator in relation to the monomer over a relatively broad range. Since these initiators vary as to their solubility in hydrocarbon, the desired product can also be obtained by proper selection of the initiator used. The monomer is contacted under polymerizing conditions with this sparingly soluble initiator which is an alkali metal derivative of a halogen-substituted aromatic compound having 1 or 2 benzenoid rings, up to 12 carbon atoms in hydrocarbon substituents and 1 or 2 ring halogens plus a functional group as subsequently defined. The polymer which results is then treated by one of various means to remove the alkali metal atoms.

Polymers which contain one or more reactive groups on the ends or in the center of the molecular chain can be obtained by our process when using an initiator in which the halogen atom of the functional halogen-substituted aromatic compound has been replaced with an alkali metal to establish a carbon-alkali metal bond. Such initiators can be obtained by reacting the halogen-substituted aromatic compound with alkali metal in an ethereal solvent or by reacting an alkali metal hydrocarbon compound with a halogen-substituted aromatic compound in which the functional group is attached directly to the benzenoid ring. We have found that in such cases the functional group of the initiator becomes a part of the polymer and retains its functionality after the alkali metal atoms have been removed. It is possible to increase the functionality of the polymer by replacing the alkali metal atoms with functional groups, for example as described in the patent to Reynolds, U.S. 3,074,917. Polymers which have a functional group on each end of the polymer molecule are known as "telechelic" while those having only one such group are "semi-telechelic."

In another aspect of our invention we provide a novel initiator system which is a complex of a normally soluble alkali metal alkyl and a functional, halogen-substituted aromatic compound as described above in which the functional group is indirectly attached to the benzenoid ring through a saturated hydrocarbon radical which in turn is attached directly to the benzenoid ring or through an oxygen, nitrogen or sulfur.

It is an object of our invention to provide an improved method for polymerizing vinylidene-containing monomers. Another object is to provide a method of polymerizing such monomers to form solid polymers having controlled inherent viscosity. Another object of our invention is to provide an improved method of preparing polymers which are terminally reactive. Still another object is to provide a new initiator composition which can be used in the polymerization of vinylidene-containing monomers to solid products. Other objects, advantages and features of our invention will be apparent to those skilled in the art from the following discussion.

The initiators which are used in our process can be prepared by reacting an alkali metal or an alkali metal-hydrocarbon derivative with a halogen-substituted, functional aromatic compound. The alkali metals which can be used include lithium, sodium, potassium, rubidium, and cesium, but lithium is preferred. It has been found that the lithium initiators provide more consistent results and can be most readily prepared and handled. Furthermore, when it is desired to increase the functionality of the polymer product by replacing the alkali metal with functional groups, a greater portion of the resulting functionality will be terminal when lithium is employed rather than the other alkali metals. The other alkali metals, and particularly sodium or potassium, can be used in the practice of our invention as broadly contemplated. For purposes of clarity the invention will be described and illustrated with the lithium derivatives.

The halogen-substituted functional aromatic compounds are selected from one of the following general formulas:

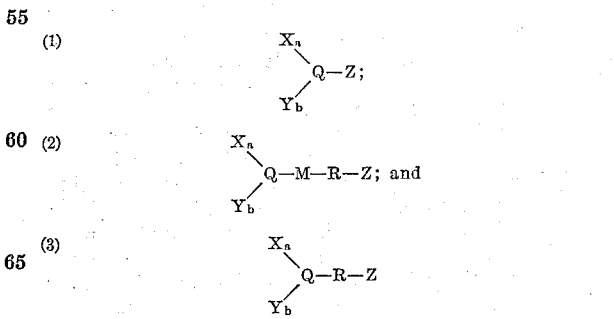

In the above formulas Q represents a polyvalent aromatic nucleus which has the ring structure of benzene, naphthalene or biphenyl. This nucleus is substituted only as illustrated in the formulas so that the carbon atoms not containing substituents as indicated contain hydrogen atoms attached thereto as they would in benzene, naphthalene or biphenyl. X represents a halogen atom and the halogen atoms which are preferred are chlorine, bromine, or iodine. The subscript "$a$" represents an integer of 1 or 2. In other words, there can be 1 or 2 halogen atoms attached to the aromatic nucleus and where there are 2 such atoms they may be the same or different. We prefer those compounds which contain but a single halogen substituent on the aromatic nucleus.

Y represents an optional hydrocarbon substituent which can be either alkyl or cycloalkyl. The total number of carbon atoms in these Y groups should not exceed 12 and it is preferred that there be no more than 6 carbon atoms in any single Y substituent. It is further preferred that the total Y groups contain no more than 6 carbon atoms. The subscript "$b$" represents an integer of 0 to 3 which means that the Y substituents can be omitted, which is most preferred, or there can be up to 3 such substituents on the aromatic nucleus. Z represents the functional group which is attached to the aromatic nucleus, either directly or indirectly through the groups illustrated in the formulas by M and R. R is a bivalent saturated hydrocarbon radical containing up to 12 carbon atoms and preferably not more than 6 carbon atoms, while M can be oxygen (—O—), sulfur (—S—) or nitrogen further attached to R'

in which the R' represents hydrogen or alkyl or cycloalkyl radicals containing up to 12 carbon atoms.

The functional groups which are attached to the halogen-substituted aromatic compounds, represented by Z in the above formulas, include for the purposes of our invention mercapto (—SH), hydroxy (—OH), amino (—NR$_2$), sulfonic (—SO$_3$H), sulfonyl halide (—SO$_2$X), carboxy (—COOH), formyl (—COH), acyl (—COR), alkoxycarbonyl, cycloalkoxycarbonyl, or aryloxycarbonyl (—COOR), formamido (—CONR$_2$) or carbothiolic (COSH). The sulfonyl halides include chlorides, bromides or iodides. In the amino and formamido groups the R's can be hydrogen, alkyl, cycloalkyl or aryl and can be the same or different. In the functional groups represented by —COR and —COOR the R can be alkyl, cycloalkyl or aryl. In the functional groups containing organic radicals, such radicals can contain up to 12 carbon atoms. It is preferred, however, that no functional group contain more than 6 carbon atoms and, in those compounds in which the functional group is attached to the aromatic nucleus through —R— or —MR—, it is further preferred that there be not more than 6 carbon atoms in the full substituent represented by —MRZ or —RZ.

The hydrocarbon lithium compound can be reacted with the halogen-substituted, functional aromatic compound in a hydrocarbon medium or a polar diluent. When using lithium metal, for example in the form of wire or chunks, the reaction is carried out in an ethereal medium such as diethyl ether, di-n-propyl ether, tetrahydrofuran, dioxane, or a mixture of such ethers. The rate at which the reaction proceeds can be expected to vary with the halogen-substituted aromatic compound selected. In cases where the reaction appears to be proceeding too slowly in a hydrocarbon medium with a hydrocarbon lithium compound, it can normally be carried out at a faster rate by adding ether or by using lithium metal and a polar solvent. In some instances it is desirable to begin the initiator preparation with hydrocarbon lithium and then use lithium metal to replace the halogen on the aromatic nucleus. When a polar solvent is used, however, it is desirable to replace the polar solvent with a hydrocarbon prior to charging the initiator to the polymerization system.

The polar diluent increases the solubility of the initiator so that if too much polar diluent is present in the polymerization system the advantage of limited initiator solubility is lost. The initiator solubility can be regulated by using small amounts of polar diluent such as diethyl ether or tetrahydrofuran in the polymerization mixture, but in such cases it is preferred that all of the polar diluent used for initiator preparation be replaced with hydrocarbon and then a carefully controlled amount of polar material added to the polymerization mixture. Increasing the solubility of the initiator by adding small amounts of polar material increases the effective concentration of the initiator and reduces the molecular weight of the product. When such measures are taken in the polymerization of conjugated dienes, it can be expected that the microstructure of the product will be affected by increasing the amount of vinyl unsaturation and decreasing the cis content of the polymer. Also such added polar material tends to increase the randomness of monomer linkage in the copolymerization of conjugated dienes and vinyl aromatic compounds.

The hydrocarbon-lithium compound can be any aliphatic, cycloaliphatic, or aromatic lithium derivative which is soluble in the diluent selected for initiator preparation. This diluent can be a polar material described above or a hydrocarbon as used in the polymerization process. A preferred method of initiator preparation involves the reaction of the halogen-substituted, functional aromatic compound with a lithium alkyl such as ethyllithium, n-butyllithium, n-hexyllithium, n-dodecyllithium or the like, in a hydrocarbon medium. The lower alkyl lithium derivatives of 2 to 6 carbon atoms are preferred. The temperatures used for initiator preparation can vary considerably, for example from —50 to 150° C., preferably from 0 to 100° C. It is convenient to use the reflux temperature of the diluent since refluxing diluent at atmospheric pressure provides a simple method of temperature control.

The reaction mixture should be well agitated. When the initiator is prepared wtih lithium metal, it should be used in excess. When using hydrocarbon lithium, this compound should be used at least in stoichiometric quantity and preferably in excess. To determine the stoichiometric ratio, it is assumed that a lithium atom adds to the aromatic compound at each halogen atom and on the functional group, excepting the tertiary amine. A molar excess up to 4 or 5 times that required by the reaction is frequently desirable and, in reactions with the XQRZ and XQMRZ type of compounds, a ratio of at least 3 mols of alkyl lithium per mol of aromatic compound is preferred.

As explained above, the halogen-substituted, functional aromatic compound has 1 or 2 benzenoid rings, by which we mean that the aromatic compound contains the aromatic nucleus of benzene, naphthalene or biphenyl. The substituents need not be on the same aromatic ring in the case of those compounds based on naphthalene or biphenyl. It is preferred that at least one position ortho to the halogen substituents should be unsubstituted. In the initiators which are prepared with lithium metal or from the aromatic compound in which the functional group is attached directly to the aromatic ring, the halogen atoms on the aromatic ring are replaced by the lithium, thus establishing a carbon-lithium bond which is active for polymerization. Where the functional aromatic compound contains 2 halogen substituents, a bifunctional initiator is obtained and polymer growth proceeds in two directions from the initiator nucelus which remains in the center of the polymer molecule. In this case the functional group which is a part of the initiator appears in the center of the polymer molecule rather than at the end. Terminal reactivity can be produced by replacing the terminal lithium atoms in the manner previously described.

In one aspect of our invention we prefer to use an initiator which is a lithium derivative of a compound which contains a single benzene nucleuas to which is attached 1 or 2 halogen atoms and the functional group "Z." The active initiators which are used in the polymerization process thus preferred are prepared from compounds having the formula

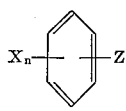

wherein X is chlorine, bromine or iodine and further wherein $n$ is 1 or 2 and Z is a functional group as previously described. In such compounds where Z is amino, it is preferred that the amino group be tertiary. In this case there can be 2 tertiary amino groups on the benzene nucleus. Such initiator compositions are lithium derivatives of N,N-disubstituted amino-benzenes and the initiators used in the polymerization can be represented by the formula

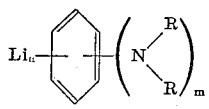

wherein $n$ and $m$ are integers of 1 or 2 and each R is an alkyl or cycloalkyl radical containing from 1 to 12 carbon atoms. Examples of such compounds are 4(N,N-dimethylamino)phenyllithium, 2,4-bis(N,N-diethylamino)phenyllithium, 4(N-methyl-N-hexylamino)phenyllithium, 3(N,N-didodecyl)-1,4-phenylenedilithium, 4(N-methyl-N-butylamino)phenyllithium, and the like. Compounds containing only one amino group are preferred.

When using the lithium derivatives of these N,N-disubstituted aminobenzenes, polymerization occurs at the carbon-lithium bond. The tertiary amino group remains unchanged and is present in the final polymeric product. If at the end of the polymerization a reagent such as an alcohol or acid is added, the lithium atoms in the polymer are replaced with hydrogen. The product thus formed, for example, when using the monolithium initiator, is a tertiary aminosemitelechelic polymer. If, on the other hand, the polymer is treated before quenching with an excess of carbon dioxide and then the lithium removed by hydrolysis with an alcohol or acid, the final product will contain two types of terminal grops, tertiary amino and carboxy. Alternatively, a bifunctional treating agent can be employed which couples the lithium-terminated polymer to produce a product which contains tertiary amino groups on each end of the polymer chain. Coupling can, for example, be effected as described in the patent of Zelinski and Hsieh, U.S. 3,078,254. Many other coupling agents can be employed as are illustrated in the examples herein. Generally if an excess of the treating agent is used, coupling is minimized and the polymer chains are terminated functionally rather than joined. Polyfunctional treating agents containing 3 or 4 reactive sites will couple 3 or more lithium-terminated polymer chains to produce polymers having long chain branches, sometimes described as "radial" polymers. In this case each polymer branch contains a terminal tertiary amino group. Treating agents which provide more than one kind of reactive group per chain end can also be used. It can be seen, therefore, that the invention provides a new method for producing terminally reactive polymers and his numerous possibilities for preparing polymers of mixed functionality. An advantage of the present method lies in the fact that one functional group is incorporated into the polymer chain by the initiator itself so that the incorporation of functionality does not depend upon replacement of a lithium atom. Since some of the lithium atoms are frequently removed by impurities before they can be replaced with functional groups, the present method enables an increase in the ultimate functionality of the product.

Another preferred initiator for the preparation of reactive polymers is the lithium derivative of a thiophenol. These initiators can be represented by the formula

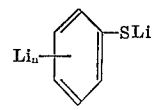

wherein $n$ is 1 or 2. In this case the halogens on the aromatic ring have been replaced with lithium which also reacts with the mercapto group to form the lithium salt. Examples of such compounds include lithium (4-lithio)thiophenolate, lithium (2-lithio)thiophenolate, lithium (3-lithio)thiophenolate, lithium (3,5-dilithio)thiophenolate, and the like. With such initiators the polymerization occurs only at the carbon-lithium bond while the —SLi group remains unchanged. During the steps involved in recovery of the polymer, the lithium atom of the —SLi group is replaced by hydrogen thereby restoring the mercapto group in the polymer. As explained above, the polymerization can be terminated by treatment with an alcohol or acid for direct removal of the lithium atoms, or the polymer can be treated prior to quenching wth reagent such as carbon dioxide which replaces the lithium attached to the carbon with a functional group. Even if the latter treating step is used, the —SLi group is not altered until the lithium is replaced with hydrogen in the final step of polymer recovery by quenching with alcohol or acid. When using an initiator having only one lithium atom on the aromatic ring, this method provides a way of obtaining polymers which contain a mercapto group on one end of the polymer and another functional group, such as carboxy or hydroxy, on the other end. On the other hand, coupling can be used to produce polymers terminated on each end with mercapto groups. Various other possibilities of termination as previously discussed are possible.

The polymers which contain mercapto groups are especially valuable where the monomer systems use conjugated dienes or such monomers as result in polymer chains containing unsaturation. These polymers are self-curing to the extent that the mercapto groups on the ends of the polymer molecules can react on heating with the double bonds in the polymer to produce crosslinks. Also, polymers of butadiene and isoprene having a high cis content can be made wtih the lithium (lithio)thiophenolate initiator.

Another type of initiator leading to terminally reactive polymers is the lithium derivative of the halogen-substituted phenols. These are similar to the thiophenols in behavior and preparation and can be represented by the formula

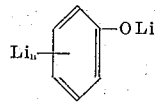

wherein $n$ is 1 or 2. Illustrative of such compounds are lithium 4-lithiophenolate, lithium 2-lithiophenolate, lithium 3-lithiophenolate, lithium 2,4-dilithiophenolate, and the like. The reaction mechanism and termination are as described above and the polymers obtained have at least one hydroxy group which is introduced by the initiator itself. The hydroxy is terminal when $n$ in the above initiator formula is 1. Replacement of the lithium atoms with functional groups can also be carried out as described or the polymer can be coupled to make a hydroxytelechelic polymer. Reacting the polymer with carbon dioxide, for example, would produce a polymer containing terminal hydroxy and carboxy groups. Esterification could subsequently be effected to increase greatly the molecular weight of the polymer.

Another type of initiator found very useful in the preparation of polymers having functionality are those prepared from halogen-substituted aromatic acids, aldehydes, ketones, esters or N,N-disubstituted amides. All of these compounds are similar in that they contain a carbonyl group in the functional substituent directly attached to the aromatic nucleus. The preferred mono- and dihalogenated benzenes which are used in preparing the initiator of this type can be represented by the formula

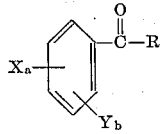

wherein each X is halogen (chlorine, bromine, or iodine), $a$ is 1 or 2, each Y is alkyl or cycloalkyl with the total Y groups containing up to 6 carbon atoms, $b$ is 0 to 3 and R is hydrogen, alkyl, cycloalkyl, aryl, OH, OR' or NR'$_2$, where each R' is alkyl, cycloalkyl or aryl radicals containing up to 6 carbon atoms. It is preferred that there be not more than one substituent, either halogen or hydrocarbon radical, in a position ortho to the carbonyl-containing group and, as previously pointed out, at least one position ortho to the halogen should also be unsubstituted. When the halogen-substituted benzene compound is an aldehyde or a ketone, the most active initiators are obtained when the halogen is ortho or para to the carbonyl-containing group. Otherwise the halogen can occupy any position on the aromatic ring. Illustrative of such compounds are 4-bromobenzaldehyde, 2,4-dichlorobenzaldehyde, 2-bromobenzaldehyde, 4-iodobenzaldehyde, 4-bromo-3,5-dimethylbenzaldehyde, 4 - bromo - 3 - $n$ - hexylbenzaldehyde, 3-bromobenzoic acid, 4-bromobenzoic acid, 2,4-dichlorobenzoic acid, 5-bromo - 2,3,4 - triethylbenzoic acid, 4-iodo-3-cyclopentylbenzoic acid, 4-bromoacetophenone, 2-bromoacetophenone, 1-(4-bromophenyl)3-methylcyclopentyl ketone, phenyl 4-iodophenyl ketone, 1-(2,4-dichloro-3-tert-butylphenyl)1 - propane, methyl 4 - bromobenzoate, cyclohexyl(4-chloro-3 - ethyl)benzoate, phenyl 4-bromobenzoate, N,N-dimethyl-4 - bromobenzamide, N-ethyl-N-cyclohexyl - 4 - chlorobenzamide,, N,N - diphenyl-(3-iodo-4,5-dimethyl)benzamide, and the like. The monohalogenated compounds and those containing no "Y" substituents are preferred.

These initiators are generally prepared by reacting the halogenated aromatic acid, aldehyde, ketone, ester or amide with a lithium alkyl as previously described. Two reactions occur, one at the carbonyl group and the other at the halogen. When the starting materials are acids, esters or amides, reactions with a lithium alkyl can result in a

group where R" is the radical from the lithium alkyl and/or an —OLi group depending upon the reactivity of the compounds and the degree to which the reaction approaches completion. When an aldehyde or ketone is the starting material an —OLi group is formed by reaction with the lithium alkyl. The second type of reaction involves the halogen on the aromatic ring which is replaced with lithium. These compounds have limited solubility in hydrocarbons and generally precipitate as soon as formed. The solid is separated by centrifugation, filtration or other means and can be washed with hydrocarbon to remove unreacted materials and side products and then redispersed in a hydrocarbon medium.

The polymerizaton, as in cases previously described, occurs at the carbon-lithium bond while the —OLi group remains unchanged. When recovering the polymer, the lithium atom of the —OLi group is replaced by hydrogen resulting in the formation of a hydroxy group on one end of each polymer chain. Treatment of the unquenched polymer with reagents such as carbon dioxide results in additional functionality such as a polymer containing both hydroxy and carboxy groups. Coupling can also occur as described above to produce hydroxy-telechelic polymer.

In another aspect of our invention, the advantages of limited initiator solubility can be enjoyed in producing polymers without functionality by using a novel initiator complex prepared by reacting a lithium alkyl with a halogen-substituted functional aromatic compound wherein the functional group is not attached directly to the aromatic ring. In this case the functional group of the initiator is not incorporated into the polymer. These complex initiator compositions are sparingly soluble in hydrocarbon diluent and can be used to polymerize vinylidene-containing monomers and particularly the conjugated dienes to form polymers of controlled inherent viscosity, generally in the range of 2.0 to 10.0. This novel composition is a product which forms on mixing an alkyl lithium, preferably a lower alkyl lithium, with a compound having the formula

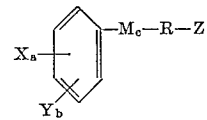

wherein $a$, $b$, M, R, Y and X are as previously defined and $c$ is an integer of 0 to 1. In other words, the M group is optional. Preferably, the total Y groups contain up to 6 carbon atoms and the bivalent saturated hydrocarbon radical as represented by R contains 1 to 3 carbon atoms. In this, as in the other compositions, it is preferred that not more than one substituent be positioned ortho to a halogen atom. Also, in preferred embodiments of the invention M is oxygen and R is a methylene group. Z is preferably hydroxy, mercapto, amino, carboxy, formyl or acetyl. Illustrative of compounds represented by the general formula are the following:

(4-bromophenyl) acetic acid,
3-(2-bromophenyl)propanoic acid,
(2,4-dichloro-3-methylphenyl)acetic acid,
2-(4-iodo-3-cyclohexylphenyl)propanoic acid,
4-chlorobenzylmercaptan,
2-(3-bromo-2,4-diisopropylphenyl)ethanthiol,
3-(4-iodophenyl)propanethiol,
4-bromobenzyl alcohol,
2-(2,4-diiodo-3,5-dimethylphenyl)ethanol,
3-(4-iodophenyl)propanol,
4-bromobenzylamine,
2-(4-bromo-2-n-butylphenyl)ethylamine,
dimethyl(3-chlorobenzyl)amine,
(4-bromophenoxy)acetic acid,
(4-iodo-3,5-diethylphenoxy)acetic acid,
3-(3-chlorophenoxy)propanoic acid,
(4-bromophenyl)mercaptoacetic acid,
4-chlorophenylmercaptomethylamine,
phenyl-(3-bromophenylmercaptoethyl)amine,
(4-iodophenyl)acetaldehyde,
(3,5-dichloro-4-n-amylphenoxy)acetaldehyde,
N,N-diisopropyl-(4-chlorophenyl)acetamide,
phenyl-(3-iodo-4-ethylphenyl)propionate,
and the like.

Initiators of the above type can be prepared by reacting the halogenated aromatic compound with lithium alkyl in hydrocarbon diluent so that a precipitate is formed. This solid product is separated by centrifugation or filtration and may be washed to remove unreacted materials and then redispersed in a hydrocarbon. The polymerization is carried out in a normal manner in a predominantly hydrocarbon diluent and the recovery procedure is the conventional method involving the use of alcohol or acid to remove the lithium from the polymer. Functionality can be introduced, however, through the replacement of lithium with functional groups. In this respect the polymers resemble those made with the lithium alkyls used in the initiator preparation. The evidence indicates that the polymerization is initiated by the lithium alkyls which are complexed with the functional aromatic compound in such a manner that solubility of the lithium alkyl in its complex form is greatly reduced, thereby permitting more accurate control of inherent viscosity of the final product.

In addition to the foregoing, the following specific compounds exemplify the types of compounds which can be reacted with lithium and/or hydrocarbon-lithium to form initiators useful in the polymerization processes of this invention:

3-chloro-1-naphthylamine,
N-dodecyl-4-bromoaniline,
N,N-di-n-propyl-4-iodoaniline,
3-chloro-4,6,7-tri-tert-butyl-1-naphthylamine,
N-cyclohexyl-4(3-bromophenyl)aniline,
8-bromo-1-naphthalenesulfonic acid,
4-chlorobenzenesulfonyl chloride,
4-bromobenzenesulfonyl chloride,
2,3,4-tri-n-butyl-5-chlorothiolbenzoic acid,
3-chloro-5-n-hexylbenzamide,
N-methyl-4-iodobenzamide,
(3-chloro-4-phenyl)benzenesulfonyl bromide,
N-phenyl-4-chloroaniline,
12-(4-chloro-3,6,7-tri-n-butyl-1-naphthyl)dodecanesulfonic acid,
4-(3-chlorophenyl)cyclohexanesulfonyl chloride,
2-(3,5-dibromophenyl)ethanesulfonyl iodide,
1-(3,4-diethyl-5-iodophenyl)-4-hexadecanone,
1-cyclohexyl-3[(3-chloro-4-phenyl)phenyl]1-propanone,
1-phenyl-5(4-chlorophenyl)-1-pentanone,
7-(4-chloro-1-naphthyl)2-heptanone,
ethyl 3-(2,5-dichlorophenyl)propionate,
cyclopentyl 12-(4-bromo-2-n-hexyl)dodecanoate,
5-(2-bromo-4-chlorophenyl)valeramide,
N-phenyl-4-bromo-phenylacetamide,
N-cyclohexyl-3(4-iodophenyl)propionamide,
4-(4-chloro-3-isopropylphenyl)thiolbutyric acid,
N-cyclohexyl-N-(3-chloro-4-phenyl)phenyl-4-N'-ethylaminobutylamine,
3-(2-chloro-4,5-diethylphenoxy)1-propanesulfonyl bromide,
1-cyclohexyl-3(3-iodo-5-methylphenylmercapto)-1-propanone,
phenyl-4-(6-iodo-1-naphthoxy)butyrate,
6-[(3-chloro-4-phenyl)phenylmercapto]caproamide,
N-cyclohexyl-8(4-chlorophenoxy)caprylamide,
12-(4-chloro-2-naphthoxy)dodecyl mercaptan,
N-4-hydroxycyclohexyl-3,5-dichloroaniline,
N-4-chlorophenyl-N-(2-aminoethyl)1-dodecylamine,
N-methyl-N-(4-chloro-5,6,7-trimethyl-2-naphthyl)6-N',N'-dimethylaminohexylamine,
12-(4-chloro-1-naphthylmercapto)1-dodecanesulfonic acid,
ethyl 4-(3-chloro-4,5,6-trimethylphenoxy)butyrate,
1-phenyl-6-(7-bromo-4,5-di-n-propyl-1-naphthoxy)1-hexanone,
methyl 5-(2-chlorophenoxy)valerate,
cyclopentyl 3-(3-bromophenoxy)propionate,
N,N-diphenyl-4-(3-chloro-5-methylphenoxy)butyramide,
and 3-(3-iodophenylmercapto)thiolpropionic acid.

The vinylidene-containing monomers which can be polymerized by the initiators described herein are preferably the conjugated dienes containing 4 to 12 carbon atoms per molecule and those containing 4 to 8 carbon atoms are more highly preferred. Examples of such conjugated dienes include 1,3-butadiene, isoprene, 2,3-dimethyl-1,3-butadiene, piperylene, 3-butyl-1,3-octadiene, 2-phenyl-1,3-butadiene and the like. Conjugated dienes containing halogen and alkoxy substituents such as chloroprene and 2-methoxy-1,3-butadiene can also be used. The conjugated dienes can be formed into homopolymers or copolymers including block copolymers prepared by charging the monomers sequentially.

Also included among the vinylidene-containing monomers are the vinyl-substituted aromatic compounds such as styrene, 1-vinylnapthalene, 2-vinyl-naphthalene and the alkyl, cycloalkyl, aryl, alkaryl, aralkyl, alkoxy, aryloxy, and dialkylamino derivatives thereof in which the total number of the carbon atoms in the combined substituents does not exceed 12. Examples include 3-methylstyrene, 4-dodecylstyrene, 4-cyclohexylstyrene, 2-ethyl-4-benzylstyrene, 4-methoxystyrene, 4-dimethylaminostyrene, 3,5-diphenoxystyrene, 4-p-tolylstyrene, 4-phenylstyrene, 4,5-dimethyl-1-vinylnaphthalene, 3-n-propyl-2-vinylnaphthalene, and the like. These vinyl-substituted aromatic compounds can be used to form homopolymers or copolymers including block copolymers with each other or with conjugated dienes.

In addition, certain polar monomers can be polymerized to form homopolymers or copoylmers with each other or copolymerized with conjugated dienes and/or vinyl-substituted aromatic compounds. Block copolymers of these monomers can be prepared by introducing the polar monomer after the non-polar monomer has polymerized. These include the vinylpyridines and the vinylquinolines in which the vinyl group is attached to a ring carbon other than a carbon in the beta position with respect to the nitrogen. Examples are the pyridine, quinoline or isoquinoline derivatives corresponding to those described in connection with the vinyl-substituted aromatic compounds. Examples include 2-vinylpyridine, 5-cyclohexyl-2-vinylpyridine, 6-methoxy-2-vinylpyridine, 3-benzyl-4-vinylpyridine, 4-phenyl-2-vinylpyridine, 4-dimethylamino-2-vinylquinoline, 3-vinylisoquinoline and the like. Other polar monomers include methyl acrylate, ethyl acrylate, methyl methacrylate, butyl methacrylate, acrylonitrile, methacrylonitrile N,N-dimethylacrylamide, and similar acrylic and alkacrylic acid esters, nitriles and N,N-disubstituted amides. Vinylfuran and N-vinylcarbozole can also be used.

The polymerizations are carried out in predominantly hydrocarbon liquid diluents at temperatures in the range of about $-100$ to $+150°$ C., preferably between $-75$ and $+75°$ C. The most desirable temperature depends upon the monomers and the initiator used in the polymerization. The amount of initiator charged can vary considerably because of its limited solubility but ordinarily the amount used is in the range of about 0.5 to 200, preferably 1 to 150 milliequivalents per 100 grams of monomers. The milliequivalents of initiator used in the polymerizations is based upon the total lithium present in the initiator composition as determined by titration or by calculation from the molarity, knowing the number of lithium atoms in each molecule of initiator. In some instances it is convenient to express the initiator charge as millimoles per 100 grams of monomer. It is readily apparent, therefore, that one mol of 4-(N,N-dimethylamino)-phenyllithium is also one equivalent and one mol of lithium 2-lithiophenolate or lithium (4-lithio)thiophenolate is two equivalents of these compounds.

Suitable hydrocarbon diluents include benzene, toluene, cyclohexane, methylcyclohexane, xylene, n-butane, n-hexane, n-heptane, isoctane, n-decane and similar paraffins, cycloparaffins and aromatics containing about 4 to 10 carbon atoms per molecule. While the polymerization diluent is predominantly hydrocarbon, it should be understood that relatively small amounts of other materials such as ethers in which the initiator can be prepared can be included to control the solubility of the initiator. In most instances such additions of polar materials will not be necessary and are to be avoided where it is desired to produce a conjugated diene polymer having high cis content.

The polymerization mixture should be agitated and the reaction time can extend from a few minutes to 100 hours or more. Usually a short induction period is required but in the time allowed for the polymerization the conversions can be expected to be nearly quantitative. At the end of the reaction the initiator can be inactivated and the polymer coagulated by adding an acid or alcohol. The polymer is then separated, washed and dried using conventional recovery techniques.

In order to introduce functional groups in the polymer in place of the lithium atoms, it is necessary to treat the polymer solution before inactivating the initiator with water, alcohol or acid. The polymer solution can be treated with carbon dioxide to introduce carboxy groups, with a cyclic disulfide or sulfur to introduce mercapto groups, with aldehyde, ketones or epoxy compounds such as acetaldehyde, acetone or ethylene oxide to introduce hydroxy groups, with carbon disulfide to introduce carbodithio groups, and the like. It is ordinarily necessary to remove the lithium atoms from the salt which forms in the termination reaction by hydrolysis using alcohol, acid or water.

The polymer can be coupled while it still contains an active terminal lithium atom by selection of the type and amount of terminating agent used. For example, carbon dioxide, depending upon the amount used, can either couple the polymer or terminate it with carboxy groups. Also the polymer containing terminal reactive groups can be coupled by reaction with a polyfunctional compound. For example, a diisocyanate can be used to couple a polymer containing terminal hydroxy groups or a polyaziridinyl compound to couple a carboxy terminated polymer.

The following examples are presented as illustrative of the invention. It is not intended, however, that the invention should be limited thereto.

*Example I*

One mol (200 grams) of 4-bromo-N,N-dimethylaniline in 300 milliliters of diethyl ether was added dropwise with stirring to 2 gram atoms (13.88 grams) of lithium wire in 100 milliliters of diethyl ether. The reaction was carried out at reflux temperature in an atmosphere of nitrogen. When the reaction subsided, the mixture was filtered to remove unreacted lithium and the filtrate divided into two portions, designated as A and B. The A portion was kept as the ether solution. Ether was evaporated to a low level from the B portion, the residue washed twice with cyclohexane and three times with benzene, and slurried in benzene. The ether solution and benzene slurry of 4(N,N-dimethylamino)phenyllithium were employed as initiators for the polymerization of butadiene as in the recipes shown below:

Polymerization Recipe

|  | Run 1 | Run 2 |
| --- | --- | --- |
| 1,3-butadiene, parts by weight | 100 | 100 |
| Toluene, parts by weight | 867 | 867 |
| Initiator, mhm.[1] | 17 | 54 |
| Portion | A | B |
| Temperature, °C | 50 | 50 |
| Time, hours | 15.75 | 15.75 |

[1] Millimols per 100 parts by weight of monomer.

The runs were shortstopped with an isopropyl alcohol solution of 2,2'-methylene-bis(4-methyl-6-tert-butylphenol), the amount used being sufficient to provide about one part by weight of the antioxidant per 100 parts by weight of the polymer. After coagulation in isopropyl alcohol, the polymer was separated and dried. The raw polymer properties are shown in Table V.

The amount of initiator charged in Run 2 was greater than in Run 1 but on account of the limited solubility of the Run 2 initiator in hydrocarbon, the polymer in Run 2 had higher inherent viscosity. The polymer in Run 2 had a higher cis and lower vinyl content than that in Run 1 which was prepared in the presence of a polar solvent.

4-bromo-N,N-dimethylaniline was reacted with lithium wire in the manner described above. When the reaction had subsided, the ether was evaporated, the residue washed with cyclohexane and toluene and solubilized in diethyl ether. Concentration was determined by titration of the ether solution with 0.1 N HCl.

The 4-lithio-N,N-dimethylaniline was employed as the initiator for the polymerization of butadiene. The following recipe was used:

| | |
| --- | --- |
| 1,3-butadiene, parts by weight | 100 |
| Toluene, parts by weight | 867 |
| Initiator, millimols | 25 |

Polymerization was carried out at 50° C. as described above. At the conclusion of the reaction, the mixture was treated with eleven millimols of $CO_2$ to couple the polymer. The $CO_2$ reacts with polymer-lithium to form a lithium carbonate which in turn reacts with more polymerlithium to couple two polymer molecules. After the lithium has been removed by treating with an alcohol, a polymer molecule having the following general formula results (P representing the polymer chain):

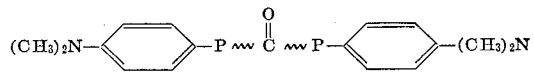

After treatment with $CO_2$ the polymer was coagulated with isopropyl alcohol, separated, and dried. About one weight percent, based on the polymer, of tris-nonylphenyl phosphite was added as the antioxidant. The product had an inherent viscosity of 0.29 and was gel-free. Perchloric acid titration showed the presence of 25.6 millimols of $-N(CH_3)_2$ group per 100 grams of polymer, thus indicating that all the tert-amino group in the initiator was present in the polymer molecule.

*Example II*

A series of runs was made for the polymerization of butadiene at 50° C. using variable levels of an initiator prepared in a manner similar to that described for A in Example I. The quantities of butadiene and toluene were the same as in the preceding example and the temperature was 50° C. Inherent viscosity and gel were determined on a portion of each polymer. The remainder was treated with a coupling agent and inherent viscosity and gel again determined. All the products were gel-free. Results are presented in the following table.

TABLE I

| Initiator Level, mhm. | Original, Inherent Viscosity | Coupling Agent | | Final Product, Inherent Viscosity |
| --- | --- | --- | --- | --- |
| | | Type | Mhm. | |
| 11 | 0.25 | Ethyl maleate | 6 | 0.45 |
| 11 | 0.30 | 2,5-hexanedione | 8 | 0.42 |
| 11 | 0.36 | $CO_2$ | 7 | 0.52 |
| 11 | 0.38 | Chloranil | 6 | 0.51 |
| 11 | 0.34 | Monex [1] | 4 | 0.44 |
| 11 | 0.29 | Adiponitrile | 2 | 0.38 |
| 11 | 0.22 | Sebaconitrile | 6 | 0.44 |
| 10 | 0.23 | $CO_2$ | 4 | 0.37 |
| 10 | 0.35 | Chloranil | 4 | 0.51 |
| 4 | 0.64 | $CO_2$ | 1.7 | 1.63 |
| 4 | 0.67 | Chloranil | 1.3 | 1.02 |

[1] Tetramethyl thiuram monosulfide.

These data show that in every case an increase in inherent viscosity was obtained after treatment with a coupling agent. The fact that the polymers remained gel-free indicates that there was coupling instead of crosslinking. The products were N,N-dimethylamino-telechelic polymers.

*Example III*

Two butadiene/styrene random copolymers were prepared, one in the presence of lithium (4-lithio)thiophenolate as the initiator to give a mercaptosemitelechelic polymer and the other using phenyllithium to give a nonfunctional polymer. The following recipe was employed for preparing the lithium (4-lithio)-thiophenolate initiator:

| | |
|---|---|
| 4-chlorothiophenol (0.05 mol), grams | 7.23 |
| n-Butyllithium, mol | 0.125 |
| Toluene, milliliters | 100 |
| Temperature, °F. | 122 |
| Time, hours | 48 |

Toluene was charged first, the reactor was purged with nitrogen, 4-chlorothiophenol was added, and finally the butyllithium in solution in n-heptane. After 48 hours the mixture was centrifuged and the supernatant liquid decanted. This procedure removed unreacted materials and side products. Approximately 140 milliliters of n-pentane was added to disperse the solid product, lithium (4-lithio) thiophenolate. This procedure removed unreacted materials and side products. An aliquot of the pentane dispersion was withdrawn, poured into a 50/50 volume mixture of ethanol and water, and titrated potentiometrically with 0.05 N HCl. Results showed an active lithium content of 65.6 mol percent.

The following recipes were employed for preparing the butadiene/styrene copolymers:

| | Run 1 | Run 2 |
|---|---|---|
| 1,3-Butadiene, parts by weight | 75 | 75 |
| Styrene, parts by weight | 25 | 25 |
| Cyclohexane, parts by weight | 780 | 580 |
| Lithium (4-lithio)thiophenolate, mhm | 2.1 | |
| Phenyllithium, mhm | | 0.95 |
| Tetrahydrofuran, parts by weight | 1.5 | 1.5 |
| Temperature, °F | 122 | 122 |
| Time, hours | 12 | 24 |
| Conversion, percent | 97.5 | 100 |

In each run the solvent was charged first, the reactor was purged with nitrogen, and styrene, butadiene, tetrahydrofuran and the initiator were added in the order named. At the close of the polymerizations the reactions were terminated by the addition of an isopropyl alcohol solution of 2,2'-methylene-bis(4-methyl-6-tert-butylphenol), the amount used being sufficient to provide one part by weight of the antioxidant per 100 parts rubber. The polymers were coagulated with isopropyl alcohol, separated, and dried. The raw polymers of Runs 1 and 2 had Mooney values (ML–4 @ 212° F.) of 48.5 and 50.9, respectively.

The polymers were compounded according to recipe A of Table VI, cured, and physical properties determined. The data are summarized in Table VII.

These data show that the mercapto-semitelechelic polymer from Run 1 had higher tensile strength, resilience, and flex life than the nonfunctional polymer. This indicates that a higher degree of cure was obtained with the polymer containing mercapto groups.

*Example VI*

The initiator described in Example III was employed for the polymerization of isoprene. The following recipe was used:

| | Run 1 |
|---|---|
| Isoprene, parts by weight | 100 |
| n-Pentane, parts by weight | 1000 |
| Initiator, mhm. | 1.3 |
| Temperature, °F. | 122 |
| Time, hours | 24 |

In this run the solvent was charged first, the reactor was purged with nitrogen, isoprene was added, and then the initiator. The product was recovered as in the preceding example. Raw properties are shown in Table V.

The polymer was compounded according to recipe B of Table VI, cured, and physical properties determined. Mixing was at 290° F. for 6 minutes. Data are presented in Table VII.

The data show that the rubber had good properties and processed very well. The sparingly soluble initiator enabled the preparation of a polymer having very high inherent viscosity.

*Example V*

The following recipe was used for the preparation of lithium (4-lithio)thiophenolate to be used as an initiator for the polymerization of butadiene:

| | |
|---|---|
| 4-chlorothiophenol (0.1 mole), parts by weight | 14.5 |
| n-Butyllithium (0.25 mole), parts by weight | 16 |
| Toluene, parts by weight | 200 |
| Temperature, °F. | 122 |
| Time, hours | 48 |

At the conclusion of the reaction the dark yellow solid which formed was separated by centrifuging the mixture and pouring off the supernatant liquid. The solid was then dispersed in 200 milliliters of cyclohexane and used in this form for the polymerization of butadiene. The following recipe was used:

| | |
|---|---|
| 1,3-butadiene, parts by weight | 100 |
| Cyclohexane, parts by weight | 780 |
| Lithium (4-lithio)thiophenolate, mhm. | 7.5 |
| Temperature, °F. | 122 |
| Time, hours | 3 |
| Conversion, percent | 100 |

Cyclohexane was charged first, the reactor was purged with nitrogen, butadiene was added, and then the initiator.

Two runs were made. One was terminated with isopropyl alcohol and the other with 0.3 part by weight per 100 parts rubber of a liquid epoxidized polybutadiene. This material, designated as Oxiron 2001, has a light yellow color, viscosity of 160 poises at 25° C., specific gravity of 1.014, epoxy content of 11.0 percent (oxirane oxygen), and an epoxy equivalent (number of grams of resin containing 1 gram mole of epoxide) of 145. The products were coagulated with isopropyl alcohol, separated, and dried, and inherent viscosity and gel were determined. Results were as follows:

TABLE II

| Terminating Agent | Inherent Viscosity | Gel, Percent |
|---|---|---|
| Isopropyl Alcohol | 1.80 | 0 |
| Oxiron 2001 | 2.71 | 0 |

In the run terminated with liquid epoxidized polybutadiene, a reaction occurred at the carbon-lithium bond resulting in a polymer with long chain branches and with a mercapto group on each chain end. The fact that branching occurred is evidenced by the increase in inherent viscosity. Termination with isopropyl alcohol gave a linear polymer with a mercapto group on one end of each polymer chain and no functional group on the other end, i.e., the product was a mercapto-semitelechelic polymer.

Lithium(4-lithio)thiophenolate was prepared by adding n-butyllithium, with stirring, to an ether solution of 4-bromothiophenol. The mixture was stirred and refluxed in a nitrogen atmosphere for 30 minutes. The product precipitated and was washed with toluene and then slurried in toluene. Concentration was determined by titration with 0.1 N HCl.

Butadiene was polymerized at 50° C. in the presence of the lithium(4-lithio)thiophenolate as the initiator. The recipe was as follows:

| | |
|---|---|
| 1,3-butadiene, parts by weight | 100 |
| Toluene, parts by weight | 867 |
| Tetrahydrofuran, parts by weight | 133.5 |
| Initiator, millimoles | 40.75 |

At the conclusion of the polymerization, a toluene solution of iodine was used to shortstop the reaction. Addition of iodine was continued until some color remained in the mixture. Methyl alcohol containing 2,2'-methylene-bis(4-methyl-6-tert-butylphenol) was added, the amount used being one weight percent, based on the polymer.

A solution of 25 millimoles of acetic acid in toluene was introduced to dissolve soluble salts and coagulation was effected with methyl alcohol. The polymer phase was separated and the product recovered by evaporation of the solvent. It had an inherent viscosity of 0.28, was gel free, and contained 1.3 weight percent of sulfur. Assuming 100% monomer conversion, this represents the theoretical amount of sulfur that should be in the product. It can thus be concluded that all the sulfur from the initiator was present in the polymer.

*Example VI*

Variable quantities of the initiator made from 4-chlorothiophenol as described in Example V were employed in a series of runs for the polymerization of butadiene. Polymerization time was 4 hours but otherwise the recipe and procedure were the same as in Example V. Inherent viscosity, gel, and microstructure were determined and results are summarized in Table V.

Although the initiator employed has only very limited solubility, it is highly efficient for the polymerization of butadiene as evidenced by the fact that at a low level it gave quantitative conversion. As the initiator level was decreased, both inherent viscosity and cis content increased. The high cis contents of polymers prepared at the low initiator levels are unusual.

*Example VII*

Isoprene was polymerized using variable quantities of the initiator made from 4-chlorothiophenol as described in Example V. The recipe was as follows:

Isoprene, parts by weight _____ 100
Cyclohexane, parts by weight _____ 780
Lithium (4-lithio)thiophenolate _____ Variable
Temperature, °F. _____ 122
Time, hours _____ 4

The polymerization procedure was the same as that used in Example V. Results of inherent viscosity and microstructure determinations are shown in Table V. Again the high efficiency of the lithium (4-litho)thiophenolate is demonstrated. The cis content was high in each of the polymers.

*Example VIII*

Lithium 2-lithiophenolate was prepared by adding 0.4 mole of n-butyllithium in solution in n-pentane to 0.2 mole of 2-bromophenol dissolved in 100 milliliters of diethyl ether. The mixture was stirred for 30 minutes. Heat of reaction caused it to reflux. At the conclusion of the reaction the mixture was centrifuged to separate the liquid from the white precipitate which formed. The precipitate was washed once with cyclohexane and three times with toluene, and slurried in toluene. This initiator was employed in a series of runs for the polymerization of butadiene and isoprene.

Runs 1, 2 and 3 used 100 parts by weight of 1,3-butadiene and Runs 4 and 5 used 100 parts of isoprene. All runs used 860 parts of toluene and 50 ml. of tetrahydrofuran per 100 grams of monomer. Initiator level was varied.

Toluene was charged first, the reactor was purged with nitrogen, the initiator was added, and then the tetrahydrofuran. The monomer was introduced last. The polymerization temperature was 50° C. and the time was 17 hours. All reactions were shortstopped with methyl alcohol containing 2,2'-methylene-bis(4-methyl-6-tert-butylphenol), the amount used being sufficient to provide one part by weight of the antioxidant per 100 parts polymer. Acetic acid was added (5–10 ml.) and the polymers were coagulated with isopropyl alcohol, separated, and dried. The initiator level, conversion, inherent viscosity, and gel data are shown in Table V.

The above procedure was repeated using initiators prepared from 3-bromophenol and 4-bromophenol for polymerization of butadiene. Liquid polymers were obtained by doubling the concentration of tetrahydrofuran, thereby increasing the solubility of the initiators.

*Example IX* n-Butyllithium (0.2 mole) was reacted with 3-bromophenol (0.1 mole) in 50 milliliters of diethyl ether to prepare lithium 3-lithiophenolate in a manner similar to that described in Example VIII. After centrifuging the reaction mixture, the precipitate was washed twice with cyclohexane and twice with toluene.

A toluene slurry of this material was employed as the initiator for the polymerization of butadiene. Three runs were made using variable initiator levels. Polymerization recipes were as follows:

| | Run | | |
|---|---|---|---|
| | 1 | 2 | 3 |
| Toluene, parts by weight | 867 | 867 | 867 |
| 1,3-butadiene, parts by weight | 100 | 100 | 100 |
| Lithium 3-lithiophenolate, mhm | 23.2 | 46.4 | 46.4 |
| Tetrahydrofuran, ml./hm.[1] | | | 100 |

[1] Milliliters per 100 grams of monomer.

In the first two runs the temperature was maintained at 50° C. for 5 hours followed by 0.75 hour at 100° C. Temperature in Run 3 was maintained at 50° C. throughout the reaction period of 5.75 hours. Each of the reactions was shortstopped with a commercial diepoxy compound designated as Epon 201 [(2-methyl-4,5-epoxycyclohexyl)methyl 2-methyl-4,5-epoxycyclohexyl carboxylate]. The amounts employed, in terms of millimoles per 100 parts monomer charged to the polymerization, were 46.4, 92.8, and 92.8, respectively, in Runs 1, 2 and 3. Upon addition of the epoxy compound, the color changed from orange-brown to yellow. A small amount of a toluene solution of hydrogen chloride was added to each run and the polymers were coagulated with isopropyl alcohol, separated, and dried. Inherent viscosity, gel, and microstructure on the polymer from Run 1 are shown in Table V.

All three polymers were gel-free. The inherent viscosities of the polymers from Runs, 1, 2 and 3 were 4.79, 3.50, and 0.20, respectively. In Run 3 tetrahydrofuran solubilized the initiator and there was, therefor, a higher effective initiator level than in the other two runs, as evidenced by the low inherent viscosity of the polymer.

An initiator for Run 4 was prepared as above by the reaction of 3-bromophenol and butyllithium. It was employed for the polymerization of butadiene in accordance with the following recipe:

Run 4
1,3-butadiene, parts by weight _____ 100
Toluene, parts by weight _____ 1060
Tetrahydrofuran, parts by weight _____ 89
Initiator, millimoles _____ 61.6

Polymerization was carried out at a temperature of 50° C. At the conclusion of the reaction, 29.8 millimoles of $CO_2$ was introduced while the mixture was agtiated. It was allowed to stand overnight at room temperature. The reaction was quenched with HCl in methyl alcohol and the polymer solution was washed with water until neutral. The product was recovered by evaporation of the solvent. It was dissolved in toluene and reprecipitated in isopropyl alcohol. The toluene-alcohol layer was decanted and 2 weight percent of 2,2'-methylene-bis(4-methyl-6-tert-butylphenol) was added to the polymer which was then dried in a vacuum oven. It had an inherent viscosity of 0.29 and was gel free. (The quantity of $CO_2$ used in this run was slightly less than the stoichiometric amount required for coupling the polymer.)

Variable amounts of 4,4′-diphenylmethanediisocyanate were added to cure the polymer by reaction with the hydroxy groups. The curing agent was added together with a small amount of pyridine as a catalyst. Inherent viscosity was determined after the samples were maintained at a temperature of 110° C. in a nitrogen atmosphere for 24 hours. The curing study is presented in the following table:

TABLE III

| Run Number | Isocyanate Added, mhm. | Gel, Percent | Inherent Viscosity |
|---|---|---|---|
| 4a | 10 | 0 | 0.46 |
| 4b | 20 | 0 | 0.63 |
| 4c | 50 | 88 | |

The increase in inherent viscosity over the value obtained for the original polymer indicated that coupling through the hydroxy group occurred. The large amount of gel in the last run indicates cross-linking. Since one mole of the diisocyanate should couple two moles of hydroxy-terminated polymer, the stoichiometric amount should be about 15 mhm. An excess of this additive caused both coupling and crosslinking.

*Example X*

A polymerization initiator was prepared by reacting n-butyllithium with 4-bromoacetophenone. The following recipe was employed:

| | |
|---|---|
| 4-bromoacetophenone, mole | 0.05 |
| n-Butyllithium, mole | 0.12 |
| Toluene (200 ml.), moles | 1.9 |
| Time, hours | 24 |
| Temperature, ° F. | 122 |

Toluene was charged to the reactor after which it was purged with nitrogen. 4-bromoacetophenone was then added, the mixture was cooled to ice bath temperature, and the butyllithium was charged. The temperature was increased to 122° F. and the reactants were agitated for 24 hours. The mixture was centrifuged to separate the solid reaction product. The supernatant liquid was discarded, the precipitate was washed once with about 200 milliliters of toluene and then with 200 milliliters of n-pentane to remove unreacted butyllithium. The washings were discarded and the solid product was dispersed in n-pentane. Total volume of the final dispersion was 300 milliliters. It had a normality of 0.255, determined by withdrawing an aliquot and titrating it with 0.1 N HCl. Total alkalinity of the dispersion expressed as equivalents of lithium was 0.0765.

The reaction product of n-butyllithium with 4-bromoacetophenone was employed as the initiator for the polymerization of isoprene. A series of runs was made using variable amounts of initiator. The recipe was as follows:

| | |
|---|---|
| Isoprene, parts by weight | 100 |
| n-Pentane, parts by weight | 1000 |
| Initiator, milliequivalents | Variable |
| Time, hours | 24 |
| Temperature, ° F. | 122 |

The diluent was charged first, the reactor was then purged with nitrogen, and isoprene was added. The initiator was introduced last. The reactants were agitated throughout the polymerization period. At the close of the polymerizations the reactions were terminated by the addition of an isopropyl alcohol solution of 2,2′-methylene-bis-(4-methyl-6-tert-butylphenol), the amount used being sufficient to provide one part by weight of the antioxidant per 100 parts of rubber. The polymers were coagulated with isopropyl alcohol, separated, and dried. Microstructure, inherent viscosity, and gel were determined on each of the hydroxy-semitelechelic products. The results are summarized in Table V.

*Example XI* n-Butyllithium was reacted with 4-bromoacetophenone using the recipe and method described in Example X. The final dispersion had a normality of 0.240. The total volume was 294 milliliters and the total alkalinity expressed as equivalents was 0.071. This dispersion was employed as the initiator for the polymerization of isoprene. The recipe was the same as given in Example X using an initiator level of 14 milliequivalents per 100 grams monomer.

The hydroxy-semitelechelic rubber was evaluated in the tread stock recipe B of Table VI. The compound was mixed at 290° F. for 6 minutes in Midget Banbury. It broke down satisfactorily and had good processing properties. Data on the raw rubber are in Table V and properties of the vulcanized stock are presented in Table VII.

The hydroxy-semitelechelic polymer had a better mill rating and better Garvey die extrusion rating than a commercial sample of cis-polyisoprene with a much lower inherent viscosity. As can be see from the data, the polymer had a very high cis content and the vulcanizate had good properties.

*Example XII*

A polymerization initiator was prepared by reacting n-butyllithium with 4-bromobenzaldehyde. The following recipe was employed:

| | |
|---|---|
| 4-bromobenzaldehyde, mole | 0.025 |
| n-Butyllithium, mole | 0.075 |
| Toluene (106 ml.), mole | 0.95 |
| Time, hours | 24 |
| Temperature, ° F. | 122 |

The procedure of Example X was employed. Total volume of the final dispersion was 161 milliliters and the total alkalinity was 0.057 equivalent. The dispersion had a normality of 0.353.

The reaction product of n-butyllithium with 4-bromobenzaldehyde was employed as the initiator for the polymerization of isoprene. A series of runs was made using variable amounts of initiator. The recipe was the same as used in Example X. Results are presented in Table V.

The hydroxy-semitelechelic polyisoprene prepared in Run 3 was evaluated in the tread stock recipe B of Table VI. Mixing was done in a Midget Banbury. Processing was good and adequate breakdown of the rubber was achieved in a single mixing cycle (6 minutes) at 290° F. Data on the properties of the vulcanized stock are presented in Table VII. The vulcanized rubber had good properties, as shown by the data.

*Example XIII*

A polymerization initiator was prepared by reacting n-butyllithium with 3-bromobenzoic acid. The following recipe was used:

| | |
|---|---|
| 3-bromobenzoic acid, mole | 0.05 |
| n-Butyllithium, mole | 0.208 |
| Toluene (200 ml.), moles | 1.9 |
| Time, hours | 24 |
| Temperature, ° F. | 122 |

The procedure was the same as employed in Example X. Total volume of the final dispersion was 336 milliliters and the total alkalinity was 0.124 equivalent. The dispersion had a normality of 0.37. This material was used as the initiator for the polymerization of isoprene. A series of runs was made in which the recipe and procedure were the same as employed in Example X. Data are presented in Table V.

The reaction of butyllithium with 3-bromobenzoic acid was carried out for Run No. 5 as described above except that the amount of toluene was 3.8 moles (400 ml.). Total volume of the final dispersion was 450 milliliters and the total alkalinity was 0.157 equivalent. The dispersion had a normality of 0.35. This material was used as the initiator for the polymerization of isoprene using 30 milliequivalents of initiator in the recipe described in Example X. The rubber was compounded in the tread stock recipe B. The stock was mixed in a Midget Banbury at 290° F. The mixing cycle was 6 minutes. Data on the raw rubber are in Table V and processing properties are shown in Table VII.

*Example XIV*

A polymerization initiator was prepared by reacting n-butyllithium with 4-bromophenylacetic acid. The following recipe was employed:

| | |
|---|---|
| 4-bromophenylacetic acid, mole | 0.025 |
| n-Butyllithium, mole | 0.104 |
| Toluene (80 ml.), mole | 0.75 |
| Time, hours | 24 |
| Temperature, ° F. | 122 |

Toluene was charged to the reactor after which it was purged with nitrogen. 4-bromophenylacetic acid was then added, the mixture was cooled to ice bath temperature, and the butyllithium was charged. The temperature was increased to 122° F. and the reactants were agitated for 24 hours. The mixture was centrifuged to separate the solid reaction product. The supernatant liquid was discarded, the preciptitate was washed once with toluene and then with n-pentane to remove unreacted butyllithium. The washings were discarded and the solid product was dispersed in n-pentane. Total volume of the final dispersion was 138 milliliters. It had a normality of 0.477, determined by withdrawing an aliquot and titrating it with 0.1 N HCl. Total alkalinity of the dispersion expressed as equivalents of lithium was 0.0658.

The reactant product of n-butyllithium with 4-bromophenylacetic acid was employed as the initiator for the polymerization of isoprene. A series of runs was made using variable amounts of initiator. The recipe was as follows:

| | |
|---|---|
| Isoprene, parts by weight | 100 |
| n-Pentane, parts by weight | 1000 |
| Initiator, milliequivalents | Variable |
| Time, hours | 24 |
| Temperature, ° F. | 122 |

The diluent was charged first, the reactor was then purged with nitrogen, and isoprene was added. The initiator was introduced last. The reactants were agitated throughout the polymerization period. At the close of the polymerization the reactions were terminated by the addition of an isopropyl alcohol solution of 2,2'-methylene-bis(4-methyl-6-tert-butylphenol), the amount used being sufficient to provide one part by weight of the antioxidant per 100 parts of rubber. The polymers were coagulated with isopropyl alcohol, separated, and dried. Microstructure, inherent viscosity, and gel were determined on each of the products. The results are summarized in Table V.

The polymer of Run No. 4 was evaluated in tread stock recipe B. The compound was mixed in a Midget Banbury for 6 minutes at 290° F. It broke down satisfactorily and had good processing properties. Data on the processing properties and properties of the vulcanized stock are presented in Table VII.

*Example XV*

A polymerization initiator was prepared by reacting n-butyllithium with 4-chlorobenzyl mercaptan. The following recipe was employed:

| | |
|---|---|
| 4-chlorobenzyl mercaptan, mole | 0.025 |
| n-Butyllithium, mole | 0.104 |
| Toluene (200 ml.), mole | 1.9 |
| Time, hours | 48 |
| Temperature, ° F. | 122 |

The procedure of Example XIV was employed. Total volume of the final dispersion was 158 milliliters and the total active alkalinity was 0.0542 equivalent. (Active alkalinity does not include —SLi.) The dispersion had an active normality of 0.343.

The reaction product of butyllithium with 4-chlorobenzyl mercaptan was employed as the initiator for the polymerization of isoprene. A series of runs was made using variable amounts of initiator. The recipe was the same as used in Example XIV. Results are presented in Table V.

The polymer of Run No. 3 was evaluated in tread stock recipe B. The stock was mixed in a Midget Banbury for 6 minutes at 290° F. and was found to break down satisfactorily. Processing properties were good. Data on the processing and properties of the vulcanized stock are presented in Table VII.

The above-described initiator, prepared by reacting n-butyllithium with 4-chlorobenzyl mercaptan, was employed in a series of runs for the polymerization of butadiene. The recipe was as follows:

| | |
|---|---|
| 1,3-butadiene, parts by weight | 100 |
| Cyclohexane, parts by weight | 780 |
| Initiator, milliequivalents | Variable |
| Time, hours | 24 |
| Temperature, ° F. | 122 |

The procedure was the same as above and the results of the polymerizations are presented in Table V.

These data show that initiators based on the reaction product of n-butyllithium and 4-chlorobenzyl mercaptan can be used to prepare cis-polymers of butadiene or isoprene of controlled inherent viscosity.

*Example XVI* n-Butyllithium was reacted with 3-bromobenzyl alcohol to prepare a polymerization initiator. The following recipe was used:

| | |
|---|---|
| 3-bromobenzyl, alcohol, mole | 0.025 |
| n-Butyllithium, mole | 0.104 |
| Toluene (100 ml.), mole | 0.95 |
| Time, hours | 24 |
| Temperature, ° F. | 122 |

The procedure employed in Example XIV was followed. Total volume of the final dispersion was 151 milliliters and the total alkalinity was 0.062 equivalent. The dispersion had a normality of 0.41. It was employed as the initiator for the polymerization of isoprene using the recipe of Example XIV. Results are shown in Table V.

The polymer from Run 3 was evaluated in tread stock recipe B. Mixing was for 6 minutes at 290° F. Processing properties and properties of the vulcanized stock are shown in Table VII. The data show that the product would be very useful as tread stock.

*Example XVII*

A polymerization initiator was prepared by reacting n-butyllithium with 4-bromobenzylamine. The following recipe was used:

| | |
|---|---|
| 4-bromobenzylamine, mole | 0.025 |
| n-Butyllithium, mole | 0.13 |
| Toluene (67 ml.), mole | 0.63 |
| Time, hours | 24 |
| Temperature, ° F. | 122 |

The procedure used was the same as in the foregoing example. Total volume of the final dispersion was 145 milliliters and the total alkalinity was 0.0965 equivalent. The normality was 0.666. This dispersion was used as the initiator for the polymerization of isoprene, the recipe and procedure being the same as that of Example XIV. Results of a series of runs are presented in Table V.

The polymer from Run 2 was evaluated in tread stock recipe B. Properties of the vulcanized stock are shown in Table VII. These data show that an excellent product is obtained using an initiator made from n-butyllithium and 4-bromobenzylamine.

Example XVIII

Four initiators of the types hereinbefore described were employed for the polymerization of butadiene and for the preparation of butadiene/styrene block copolymers. The diluent was charged first and the reactor was then purged with nitrogen. Butadiene was added and then the styrene, when used. The intiator was charged last. The recipes were as follows:

|  | A | B |
|---|---|---|
| 1,3-butadiene, parts by weight | 75 | 100 |
| Styrene, parts by weight | 25 | |
| Cyclohexane, parts by weight | 780 | 780 |
| Initiator, meq./hm. | (1) | (1) |
| Time, hours | 24 | 24 |
| Temperature, °F | 122 | 122 |

[1] Variable.

A summary of the runs is presented in the following table:

The initiators are thus shown to be useful for preparing block polymers.

Example XIX

A polymerization initiator was prepared by reacting n-butyllithium with (4-bromophenoxy)acetic acid in accordance with the following recipe:

| | |
|---|---|
| (4-bromophenoxy)acetic acid, mole | 0.025 |
| n-Butyllithium, mole | 0.104 |
| Toluene (100 ml.), mole | 0.95 |
| Time, hours | 24 |
| Temperature, °F. | 122 |

The procedure was the same as that used in the preceding example. Total volume of the final dispersion was 137 milliliters and the total alkalinity was 0.0795 equivalent. The normality was 0.58. This dispersion was used as the initiator for the polymerization of isoprene, the recipe and procedure being the same as that of Example XIV. Results of a series of runs are presented in Table V.

These data show that the initiator level can be regulated to control inherent viscosity without greatly decreasing the cis content of the polymer.

In Table V all the polymers are polyisoprene except those runs indicated by (*) in which case the polymers are polybutadiene.

TABLE IV

| Run No. | Recipe | Initator BuLi Deriv. of | Meq./hm. | Conv., Percent | Ref. Index | Polystyrene Percent [1] | Inh. Visc. |
|---|---|---|---|---|---|---|---|
| 1 | A | 3-Br-benzyl alcohol | 20 | 95.0 | 1.5355 | 18.7 | 1.23 |
| 2 | B | do | 20 | 96.8 | 1.5178 | | 1.56 |
| 3 | A | 4-Cl-benzyl mercaptan | 20 | 95.8 | 1.5359 | 20.2 | 1.50 |
| 4 | B | do | 20 | 98.4 | 1.5182 | | 1.68 |
| 5 | A | 4-Br-phenylacetic acid | 45 | 85.5 | 1.5346 | 17.1 | 0.51 |
| 6 | B | do | 45 | 80.0 | 1.5175 | | 0.60 |
| 7 | A | 4-Br-benzylamine | 25 | 97.8 | 1.5352 | 18.6 | 1.90 |
| 8 | B | do | 25 | 99.4 | 1.5182 | | 2.27 |

[1] Determined by oxidative degradation.

TABLE V.—RAW POLYMER PROPERTIES

| | Example | | | | | | | | | |
|---|---|---|---|---|---|---|---|---|---|---|
| | I | I | IV | VI | VI | VI | VI | VI | VI | VII |
| Run | *1 | *2 | 1 | *1 | *2 | *3 | *4 | *5 | *6 | 1 |
| Initiator, Meq./hm.([1]) | 17 | 54 | 2.6 | 20 | 15 | 10 | 6 | 4 | 3 | 20 |
| Conversion, percent | | | 100 | 100 | 100 | 100 | 100 | 100 | 100 | 100 |
| Mooney, ML-4 at 212° F.([2]) | | | 74.8 | | | | | | | |
| Microstructure, percent ([3]): | | | | | | | | | | |
| Cis | 28.6 | 40.0 | 87.3 | 46.2 | 48.1 | 50.5 | 58.7 | 70.6 | 74.0 | 78.1 |
| 3,4-addition | | | 7.1 | | | | | | | 9.0 |
| Trans | 40.2 | 45.5 | | 47.2 | 45.5 | 43.4 | 35.8 | 25.0 | 22.5 | |
| Vinyl | 31.2 | 14.5 | | 6.6 | 6.4 | 6.1 | 5.5 | 4.4 | 3.5 | |
| Normalized cis | | | 92.5 | | | | | | | 89.5 |
| Normalized 3,4-addition | | | 7.5 | | | | | | | 10.5 |
| Inherent Viscosity ([4]) | 0.31 | 2.02 | 13.10 | 1.84 | 2.25 | 2.99 | 5.03 | 7.52 | 9.05 | 2.71 |
| Gel, percent ([5]) | 0 | 0 | 0 | 0 | 0 | 0 | 0 | 0 | 0 | 0 |

| | Example | | | | | | | | | |
|---|---|---|---|---|---|---|---|---|---|---|
| | VII | VII | VII | VII | VII | VIII | VIII | VIII | VIII | IX |
| Run | 2 | 3 | 4 | 5 | 6 | *1 | *2 | *3 | 4 | 5 | *1 |
| Initiator, Meq./hm. | 15 | 10 | 6 | 4 | 3 | 21.7 | 43.4 | 108.5 | 43.4 | 108.5 | 46.4 |
| Conversion, percent | 100 | 100 | 100 | 100 | 100 | 100 | 100 | 95 | 88 | 77 | |
| Mooney, ML-4 at 212° F | | | | | | | | | | | |
| Microstructure, percent: | | | | | | | | | | | |
| Cis | 84.2 | 84.2 | 85.8 | 91.9 | 95.0 | | | | | | 38.5 |
| 3,4-addition | 8.9 | 8.1 | 8.1 | 7.9 | 6.8 | | | | | | |
| Trans | | | | | | | | | | | 48.7 |
| Vinyl | | | | | | | | | | | 12.8 |
| Normalized cis | 90.4 | 91.2 | 91.4 | 92.1 | 93.3 | | | | | | |
| Normalized 3,4-addition | 9.6 | 8.8 | 8.6 | 7.9 | 6.7 | | | | | | |
| Inherent Viscosity | 3.21 | 4.34 | 6.53 | 9.35 | 10.68 | 2.42 | 1.49 | 0.94 | 0.90 | 0.67 | 4.79 |
| Gel, percent | 0 | 0 | 0 | 0 | 0 | 0 | 0 | 0 | Trace | 0 | 0 |

TABLE V—Continued

| | Example | | | | | | | | | | |
|---|---|---|---|---|---|---|---|---|---|---|---|
| | X | X | X | X | XI | XII | XII | XII | XIII | XIII | XIII |
| Run | 1 | 2 | 3 | 4 | 1 | 1 | 2 | 3 | 1 | 2 | 3 |
| Initiator, Meq./hm | 20 | 16 | 12 | 10 | 14 | 10 | 8 | 6 | 45 | 24 | 18 |
| Conversion, percent | 96.5 | 96.2 | 96.5 | 87.0 | | 100 | 100 | 100 | 100 | 100 | 95.8 |
| Mooney, ML-4 at 212° F | | | | | 89 | | | 69.5 | | | |
| Microstructure, percent: | | | | | | | | | | | |
| Cis | 93.4 | 96.5 | 93.4 | 93.4 | 96.4 | 76.6 | 79.6 | 85.8 | | | |
| 3,4-addition | 7.2 | 7.2 | 6.7 | 7.0 | 7.0 | 8.5 | 8.7 | 7.5 | | | |
| Trans | | | | | | | | | | | |
| Vinyl | | | | | | | | | | | |
| Normalized cis | | | | | 93.2 | | | | 92.2 | 92.9 | 93.3 |
| Normalized 3,4-addition | | | | | 6.8 | | | | 7.8 | 7.1 | 6.7 |
| Inherent Viscosity | 10.92 | 13.83 | 11.54 | 11.53 | 10.77 | 7.57 | 9.19 | 8.90 | 6.41 | 7.85 | 8.78 |
| Gel, percent | 0 | 0 | 0 | 0 | 0 | 0 | 0 | 0 | 0 | 0 | 0 |

| | Example | | | | | | | | | | |
|---|---|---|---|---|---|---|---|---|---|---|---|
| | XIII | XIII | XIV | XIV | XIV | XIV | XV | XV | XV | XV | XV |
| Run | 4 | 5 | 1 | 2 | 3 | 4 | 1 | 2 | 3 | *4 | *5 |
| Initiator, Meq./hm | 16.5 | 30 | 12 | 9 | 6 | 5.25 | 8 | 5 | 4 | 4 | 2 |
| Conversion, percent | 93.2 | | 100 | 100 | 100 | 100 | 100 | 100 | 100 | 100 | 98.8 |
| Mooney, ML-4 at 212° F | | 66 | | | | 64 | | | 57 | | |
| Microstructure, percent: | | | | | | | | | | | |
| Cis | | | 90.4 | 76.6 | 79.6 | 87.3 | 79.6 | 79.6 | 90.4 | 82.7 | 55.7 | 69.2 |
| 3,4-addition | | | 8.7 | 9.9 | 9.3 | 9.5 | 9.5 | 9.6 | 8.9 | 8.0 | | |
| Trans | | | | | | | | | | | 38.6 | 25.4 |
| Vinyl | | | | | | | | | | | 5.7 | 5.4 |
| Normalized cis | 93.6 | | | | | | | | | | | |
| Normalized 3,4-addition | 6.4 | | | | | | | | | | | |
| Inherent Viscosity | 8.07 | 9.20 | 2.29 | 3.17 | 4.83 | 4.99 | 5.69 | 6.62 | 8.73 | 5.44 | 8.56 |
| Gel, percent | 0 | 0 | 0 | 0 | 0 | 0 | 0 | 0 | 0 | 0 | 0 |

| | Example | | | | | | | | | |
|---|---|---|---|---|---|---|---|---|---|---|
| | XV | XVI | XVI | XVI | XVII | XVII | XIX | XIX | XIX | XIX |
| Run | *6 | 1 | 2 | 3 | 1 | 2 | 1 | 2 | 3 | 4 |
| Initiator, Meq./hm | 1.6 | 5 | 4 | 3.5 | 8 | 5.5 | 15 | 30 | 60 | 90 |
| Conversion, percent | 100 | 100 | 100 | 100 | 100 | 100 | 100 | 100 | 100 | 10 |
| Mooney, ML-4 at 212° F | | | | 61.5 | | 65 | | | | |
| Microstructure, percent: | | | | | | | | | | |
| Cis | 73.8 | 73.5 | 82.7 | 79.6 | 84.2 | 85.8 | 84.2 | 81.2 | 79.6 | 82.7 |
| 3,4-addition | | 8.5 | 7.3 | 8.3 | 8.5 | 8.4 | 8.6 | 9.5 | 9.5 | 9.9 |
| Trans | 21.5 | | | | | | | | | |
| Vinyl | 4.7 | | | | | | | | | |
| Normalized cis | | | | | | | | | | |
| Normalized 3,4-addition | | | | | | | | | | |
| Inherent Viscosity | 9.32 | 6.32 | 8.55 | 9.27 | 6.34 | 6.60 | 6.06 | 4.38 | 3.15 | 2.82 |
| Gel, percent | 0 | 0 | 0 | 0 | 0 | 0 | 0 | 0 | 0 | 0 |

[1] Milliequivalents per 100 grams of monomer.

[2] ASTM D 1646-61.

[3] Microstructures were determined with a commercial infrared spectrometer. For a polyisoprene the samples were dissolved in carbon disulfide so as to form a solution containing 25 grams of polymer per liter of solution. Calibrations were based on deprotenized natural rubber as a reference material assuming that it contained 98 percent cis and 2 percent 3,4-addition product. The cis was measured at the 8.9 micron band and 3,4-addition at the 11.25 micron band. In the presence of a high cis polyisoprene, trans is not detectable, since trans is measured at the 8.75 micron band. The raw cis and raw 3,4-addition can be converted to normalized values by changing each value proportionally so that their sum equals 100%. For polybutadiene, similar polymer solutions were formed and the percent of the total unsaturation present as trans 1,4- was calculated according to the following equation and consistent units: $\epsilon = E/tc$, where $\epsilon$=extinction coefficient (liters-mols$^{-1}$-centimeters$^{-1}$); E=extinction (log $I_o/I$); t=path length (centimeters); and c=concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters$^{-1}$). The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

[4] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

[5] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

TABLE VI.—COMPOUNDING RECIPES
[Parts by weight]

| RECIPE | A | B |
|---|---|---|
| Rubber | 100 | 100 |
| High Abrasion Furnace Black | 50 | 50 |
| Zinc Oxide | 3 | 3 |
| Stearic Acid | 2 | 3 |
| Flexamine [1] | 1 | 1 |
| Flexzone 3c [2] |  | 2 |
| Philrich 5 [3] | 10 | 5 |
| Pepton 22 [4] |  | 1 |
| Sulfur | 1.75 | 2.25 |
| Santocure [5] | 1.0 |  |
| NOBS Special [6] |  | 0.5 |

[1] Physical mixture containing 65 percent of a complex diarylamine-ketone reaction product and 35 percent of N,N'-diphenyl-p-phenylenediamine.
[2] N-isopropyl-N'-phenyl-p-phenylenediamine.
[3] Aromatic oil.
[4] 2,2'-dibenzamidodiphenyl disulfide.
[5] N-cyclohexyl-2-benzothiazolesulfenamide.
[6] N-oxydiethylenebenzothiazole-2-sulfenamide.

In Table VII Runs 1 and 2 of Example III are made with butadiene/styrene random copolymers while all the other runs are with polyisoprene.

TABLE VII.—COMPOUNDED POLYMER PROPERTIES

|  | Example | | | | | | | | | |
|---|---|---|---|---|---|---|---|---|---|---|
|  | III | III | IV | XI | XII | XIII | XIV | XV | XVI | XVII |
| Run | 1 | 2 | 1 | 1 | 3 | 5 | 4 | 3 | 3 | 2 |
| Mooney, MS-1½ at 212° F.[1] | 38.7 | 40.9 | 29.9 | 25.3 | 29.3 | 34.6 | 29.2 | 26.5 | 31.5 | 35.8 |
| Extrusion at ° F.[2] | 250 | 250 | 195 | 195 | 195 | 195 | 195 | 195 | 195 | 195 |
| In./min | 70.5 | 73.5 | 66.2 | 62.5 | 63 | 44.0 | 61.5 | 63.0 | 51.0 | 53.2 |
| Grams/min | 136.0 | 135.0 | 118.5 | 115.5 | 121 | 77.5 | 121.0 | 119.0 | 100 | 100 |
| Garvey Die Rating [3] | 11− | 11− | 10− | 11+ | 12− | 10− | 11+ | 11+ | 10+ | 11− |
| Curing Time, min | 30 | 30 | 45 | 30 | 45 |  | 30 | 30 | 45 | 45 |
| Curing Temp., ° F | 307 | 307 | 292 | 293 | 293 |  | 293 | 293 | 293 | 293 |
| ν×10⁴, Mols/cc.[4] |  |  | 1.39 | 1.39 | 1.38 |  | 1.57 | 1.62 | 1.40 | 1.49 |
| 390% Modulus, p.s.i.[5] | 1,620 | 1,580 | 1,290 | 1,240 | 1,300 |  | 1,270 | 1,440 | 1,190 | 1,475 |
| Tensile, p.s.i.[5] | 3,500 | 3,360 | 2,830 | 3,170 | 2,820 |  | 3,160 | 3,410 | 3,190 | 3,410 |
| Elongation, percent [5] | 540 | 520 | 520 | 550 | 515 |  | 565 | 580 | 595 | 530 |
| Max. Tensile at 200° F | 1,490 | 1,360 | 2,035 |  | 2,005 |  |  |  | 1,860 | 1,975 |
| Δ T, ° F.[6] | 49.7 | 48.7 | 42.9 | 41.3 | 43.3 |  | 36.5 | 34.0 | 39.2 | 37.8 |
| Resilience, percent [7] | 70.5 | 69.9 | 73.5 | 70.6 | 71.8 |  | 72.5 | 73.6 | 72.0 | 71.0 |
| Hardness, Shore A [8] | 64.0 | 65.0 | 53.5 | 58.0 | 54.5 |  | 59.0 | 59.0 | 58.0 | 59.0 |
| Flex Life, M [9] | 10.2 | 7.7 |  |  |  |  |  |  |  |  |

[1] ASTM D 1646-61.
[2] Measured using Royle No. ½ tuber with a barrel having an inside diameter of 1 inch, a Garvey die and a screw speed of 40 r.p.m. Thirty minutes is allowed for temperature to reach equilibrium before starting the test. Specimens are the extrudate over 1 minute operation.
[3] Modification of the tubing test of Garvey, Whitlock and Freeze, Ind. Engr. Chem. 34, 1309 (1942) using No. ½ Royle extruder and Garvey die. Quality of the edge, surface and corners of the extrudate is judged on a scale of 1 to 4 each, 3 to 12 total, 12 being the highest quality.
[4] Swelling method of Kraus, Rubber World 135, 67–73, 254–260 (1956). This value is the number of network chains per unit volume of rubber. The higher the number, the more the rubber is crosslinked (vulcanized).
[5] ASTM D412-61T. Scott Tensile Machine L-6. Tests made at 80° F.
[6] ASTM D623-58. Method A. Goodrich Flexometer, 143 lbs./sq. in. load, 0.175 inch stroke. Test specimen is a right circular cylinder 0.7 inch in diameter and one inch high.
[7] ASTM D945-59 (modified). Yerzley Oscillograph. Test specimen is a right circular cylinder 0.7 inch in diameter and one inch high.
[8] ASTM D676-59T. Shore Durometer, Type A.
[9] DaMattia, thousands of flexures to failure, ASTM D813-59.

The reaction products of alkyllithium and functional benzyl compounds are not single organometallic compounds but complex mixtures. When excess alkyllithium is used in the initiator preparation, a "super alkalinity" can be observed in the product. The reaction product of 4 mols of butyllithium and 1 mol of 3-bromobenzyl alcohol was hydrolyzed and the evolved gases identified by gas chromatography. About 37 percent butane was evolved. This indicates that one-third of the alkalinity of the initiator was due to butyllithium which was not removed by washing the precipitate with hydrocarbon.

Similar results were observed with the reaction product of butyllithium and 4-chlorobenzylmercaptan. As the ratio of butyllithium to mercaptan decreased, so did the butane analysis. Results indicated that at least 5% of the initiator's alkalinity should be complexed butyllithium for good polymerization activity. Additional alkyllithium can be complexed with a preformed initiator if desired. The complex formed is fairly stable and, after the initial wash, repeated washings with hydrocarbon do not diminish the alkyllithium present in the composition.

Polymers prepared with the initiator based on benzylmercaptan evidence very little sulfur content, e.g., less than 0.01%. This shows that the polymerization is initiated by the alkyllithium and that the benzyl-type compounds serve as complexing carriers which limit the solubility of the initiator system in the hydrocarbon diluent, thereby facilitating the control of the process and molecular weight of the polymer formed.

As will be apparent to those skilled in the art, various modifications can be made in this invention without departing from the spirit or scope thereof.

We claim:

1. A polymerization process which comprises contacting a vinylidene-containing monomer under polymerization conditions in a predominantly hydrocarbon liquid diluent with an initiator sparingly soluble in said diluent, said initiator being an alkali metal derivative of a halogen-substituted aromatic compound having 1 to 2 benzenoid rings, up to 12 carbon atoms in hydrocarbon substituents, and 1 to 2 ring halogens plus a functional group selected from the group consisting of mercapto, hydroxy, amino, sulfonic, sulfonyl halide, carboxy, formyl, acyl, alkoxycarbonyl, cycloalkoxycarbonyl, aryloxycarbonyl, formamido, and carbothiolic wherein the halogen of said halogen-substituted aromatic compound has been replaced by said alkali metal and treating the resulting polymer to remove the alkali metal atoms.

2. The process of claim 1 wherein said functional group is mercapto attached directly to a benzenoid ring.

3. The process of claim 1 wherein said functional group is hydroxy attached directly to a benzenoid ring.

4. The process of claim 1 wherein said functional group is tertiary amino attached directly to a benzenoid ring.

5. The process of claim 1 wherein said functional group contains a carbonyl attached directly to a benzenoid ring.

6. The process of claim 1 wherein said functional group is attached to a saturated hydrocarbon radical which is attached directly to a benzenoid ring.

7. The process of claim 1 wherein said functional group is attached to a saturated hydrocarbon radical which is attached to a benzenoid ring through an element selected from the group consisting of oxygen, nitrogen, and sulfur.

8. A polymerization process which comprises contacting a vinylidene-containing monomer under polymerization conditions in a predominantly hydrocarbon liquid diluent with an initator sparingly soluble in said diluent, said initiator being a lithium derivative of a compound having a formula selected from the group consisting of (1) 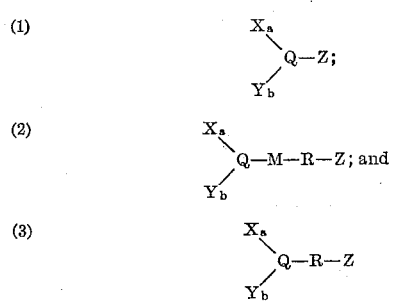

(2)

(3)

wherein
Q is a polyvalent aromatic nucleus having the ring structure of a compound selected from the group consisting of benzene, naphthalene, and biphenyl;
each X is a halogen selected from the group consisting of chlorine, bromine, and iodine;
$a$ is an integer of 1 to 2;
each Y is selected from the group consisting of alkyl and cycloalkyl radicals with the total Y groups containing up to 12 carbon atoms;
$b$ is an integer of 0 to 3;
M is is selected from the group consisting of —O—, —S—, and

in which R' is selected from the group consisting of hydrogen, alkyl and cycloalkyl radicals containing up to 12 carbon atoms;
R is a bivalent saturated hydrocarbon radical containing up to 12 carbon atoms;
and Z is a functional group selected from the group consisting of mercapto, hydroxy, amino, sulfonic, sulfonyl halide, carboxy, formyl, acyl, alkoxycarbonyl, cycloalkoxycarbonyl, aryloxycarbonyl, formamido, and carbothiolic;
wherein the halogen of said compound is replaced with lithium and treating the resulting polymer to remove the lithium atoms.

9. A polymerization process which comprises contacting a conjugated diene having 4 to 12 carbon atoms under polymerization conditions in a predominantly hydrocarbon liquid diluent with an initiator sparingly soluble in said diluent, said initiator having the formula

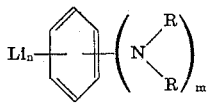

wherein $n$ and $m$ are integers of 1 to 2 and each R is selected from the group consisting of alkyl and cycloalkyl radicals containing from 1 to 12 carbon atoms, and treating the resulting polymer to remove the lithium atoms.

10. The process of claim 9 wherein said conjugated diene is 1,3-butadiene and said initiator is 4-lithio-N,N-dimethylaniline.

11. The process of claim 9 wherein said polymer is treated with a polyfunctional coupling agent.

12. A polymerization process which comprises contacting a conjugated diene having 4 to 12 carbon atoms under polymerization conditions in a predominantly hydrocarbon liquid diluent with an initiator sparingly soluble in said diluent, said initiator having the formula

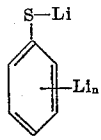

wherein $n$ is an integer of 1 to 2, and treating the resulting polymer to remove the lithium atoms.

13. The process of claim 12 wherein said initiator is lithium (4-lithio) thiophenolate.

14. A polymerization process which comprises contacting a conjugated diene having 4 to 12 carbon atoms under polymerization conditions in a predominantly hydrocarbon liquid diluent with an initiator sparingly soluble in said diluent, said initiator having the formula

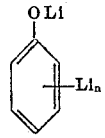

wherein $n$ is an integer of 1 to 2, and treating the resulting polymer to remove the lithium atoms.

15. The process of claim 14 wherein said initiator is lithium 3-lithiophenolate.

16. A polymerization process which comprises contacting a conjugated diene having 4 to 12 carbon atoms under polymerization conditions in a predominantly hydrocarbon liquid diluent with an initiator sparingly soluble in said diluent, said initiator being the reaction product of an alkyllithium and a compound having the formula

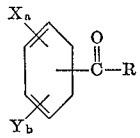

wherein
each X is a halogen selected from the group consisting of chlorine, bromine, and iodine;
$a$ is an integer of 1 to 2;
each Y is selected from the group consisting of alkyl and cycloalkyl radicals with the total Y groups containing up to 6 carbon atoms;
$b$ is an integer of 0 to 3;
and R is selected from the group consisting of H, OR',

and R' where R' is selected from the group consisting of alkyl, cycloalkyl, and aryl radicals containing up to 6 carbon atoms;
wherein the halogen of said compound is replaced with lithium and treating the resulting polymer to remove the lithium atoms.

17. The process of claim 16 wherein said alkyllithium is n-butyllithium and said compound is 4-bromoacetophenone.

18. The process of claim 16 wherein said alkyllithium is n-butyllithium and said compound is 4-bromobenzaldehyde.

19. The process of claim 16 wherein said alkyllithium is n-butyllithium and said compound is 3-bromobenzoic acid.

20. A method of making a reactive polymer which comprises contacting a vinylidene-containing monomer under polymerization conditions with an initiator which is the organo-alkali metal derivative formed by reacting an alkali metal in ethereal solvent with a compound having a formula selected from the group consisting of (1) 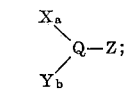

(2) 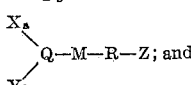

(3) 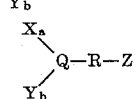

wherein
- Q is a polyvalent aromatic nucleus having the ring structure of a compound selected from the group consisting of benzene, naphthalene, and biphenyl;
- each X is a halogen selected from the group consisting of chlorine, bromine, and iodine;
- $a$ is an integer of 1 to 2;
- each Y is selected from the group consisting of alkyl and cycloalkyl radicals with the total Y groups containing up to 12 carbon atoms;
- $b$ is an integer of 0 to 3;
- M is selected from the group consisting of —O—, —S—, and $$-\overset{R'}{\underset{|}{N}}-$$

in which R' is selected from the group consisting of hydrogen, alkyl and cycloalkyl radicals containing up to 12 carbon atoms;
- R is a bivalent saturated hydrocarbon radical containing up to 12 carbon atoms;
- and Z is a functional group selected from the group consisting of mercapto, hydroxy, amino, sulfonic, sulfonyl halide, carboxy, formyl, acyl, alkoxycarbonyl, cycloalkoxycarbonyl, aryloxycarbonyl, formamido, and carbothiolic;

wherein the halogen compound is replaced by said alkali metal and treating the resulting polymer to remove the alkali metal atoms.

21. A method of making a terminally reactive polymer which comprises contacting a vinylidene-containing monomer under polymerization conditions with an initiator which is an alkali metal derivative of a compound having the formula

wherein
- Q is a polyvalent aromatic nucleus having the ring structure of a compound selected from the group consisting of benzene, naphthalene, and biphenyl;
- each X is a halogen selected from the group consisting of chlorine, bromine, and iodine;
- each Y is selected from the group consisting of alkyl and cycloalkyl radicals with the total Y groups containing up to 12 carbon atoms;
- $b$ is an integer of 0 to 3;
- and Z is a functional group selected from the group consisting of mercapto, hydroxy, amino, sulfonic, sulfonyl halide, carboxy, formyl, acyl, alkoxycarbonyl, cycloalkoxycarbonyl, aryloxycarbonyl, formamido, and carbothiolic;

wherein the halogen compound is replaced by said alkali metal and treating the resulting polymer to remove the alkali metal atoms.

22. A polymerization process which comprises contacting a conjugated diene having 4 to 12 carbon atoms under polymerization conditions in a predominantly hydrocarbon liquid diluent with an initiator sparingly soluble in said diluent, said initiator being a product which forms on mixing an alkyllithium with a compound having the formula

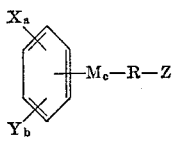

wherein
- each X is halogen selected from the group consisting of chlorine, bromine, and iodine;
- $a$ is an integer of 1 to 2;
- each Y is selected from the group consisting of alkyl and cycloalkyl radicals, the total Y groups containing up to 6 carbon atoms;
- $b$ is an integer of 0 to 3;
- M is selected from the group consisting of —O—, —S—, and $$-\overset{R'}{\underset{|}{N}}-$$

in which R' is selected from the group consisting of hydrogen, alkyl and cycloalkyl radicals containing up to 12 carbon atoms;
- $c$ is an integer of 0 to 1;
- R is a bivalent saturated hydrocarbon radical containing 1 to 3 carbon atoms;
- and Z is a functional group selected from the group consisting of mercapto, hydroxy, amino, sulfonic, sulfonyl halide, carboxy, formyl, acyl, alkoxycarbonyl, cycloalkoxycarbonyl, aryloxycarbonyl, formamido, and carbothiolic, said Z group containing up to 12 carbon atoms; there being not more than one substituent positioned ortho to a halogen;

wherein the halogen of said compound is replaced with lithium and treating the resulting polymer to remove the lithium atoms.

23. The process of claim 22 wherein said compound is 4-bromophenylacetic acid.

24. The process of claim 22 wherein said compound is 4-chlorobenzyl mercaptan.

25. The process of claim 22 wherein said compound is 3-bromobenzyl alcohol.

26. The process of claim 22 wherein said compound is 4-bromobenzylamine.

27. The process of claim 22 wherein said compound is (4-bromophenoxy) acetic acid.

28. A product which forms on mixing a molar excess of alkyllithium and a compound having the formula

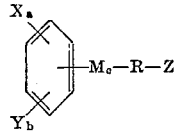

wherein
- each X is halogen selected from the group consisting of chlorine, bromine, and iodine;
- $a$ is an integer of 1 to 2;
- each Y is selected from the group consisting of alkyl and cycloalkyl radicals, the total Y groups containing up to 6 carbon atoms;
- $b$ is an integer of 0 to 3;
- M is selected from the group consisting of —O—, —S—, and $$-\overset{R'}{\underset{|}{N}}-$$

in which R' is selected from the group consisting of hydrogen, alkyl and cycloalkyl radicals containing up to 12 carbon atoms;
- $c$ is an integer of 0 to 1;
- R is a bivalent saturated hydrocarbon radical containing 1 to 3 carbon atoms;
- and Z is a functional group selected from the group consisting of mercapto, hydroxy, amino, sulfonic, sulfonyl halide, carboxy, formyl, acyl, alkoxycarbonyl, cycloalkoxycarbonyl, aryloxycarbonyl, formamido, and carbothiolic, said Z group containing up to 12 carbon atoms;

there being not more than one substituent positioned ortho to a halogen, wherein the halogen of said compound is replaced by lithium.

No references cited.

JOSEPH L. SCHOFER, *Primary Examiner.*

H. I. CANTOR, *Assistant Examiner.*